Feb. 23, 1932.  H. A. SMITH  1,846,226

TRAP

Filed Dec. 7, 1929

INVENTOR
Herbert A. Smith
BY Lawrence K. Sager
his ATTORNEY

Patented Feb. 23, 1932

1,846,226

UNITED STATES PATENT OFFICE

HERBERT A. SMITH, OF BETHLEHEM, PENNSYLVANIA, ASSIGNOR TO SARCO COMPANY, INC., A CORPORATION OF NEW YORK

TRAP

Application filed December 7, 1929. Serial No. 412,417.

This invention relates to steam or vapor traps and is especially desirable for use with the usual radiators for heating buildings.

One of the main objects of the invention is to provide an improved form of construction, such that the head of the valve, as it automatically closes, will be caused to properly enter and seat in its closed position and thereby insure the proper and complete closing of the valve. Another object is to provide a properly located shield which will protect from erosion the expansible element which controls the movement of the valve. Other objects are to provide a simple and durable form of construction which may be economically manufactured and conveniently inspected and prepared. Other objects and advantages will appear from the following description and drawings illustrating a preferred form of this invention.

Figure 1:
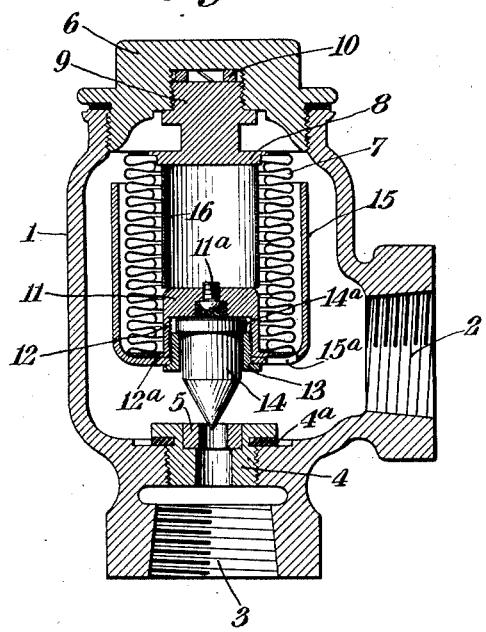
Figure 2:
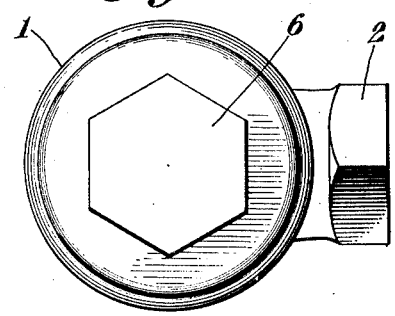

Fig. 1 is a vertical sectional view; and Fig. 2 is a plan view.

The structure comprises a main body enclosing portion 1 having an inlet opening 2 adapted to be conveniently connected to a source of steam or vapor supply, and an outlet 3 adapted to be connected to a discharge pipe. Above the outlet is a threaded nut 4 having a threaded engagement with the body portion of the valve at the outlet opening and making a tight joint by means of a gasket 4a. The nut 4 has an opening therethrough for discharge of the liquid and is recessed at its upper portion to receive a ring 5 of appropriate metal to form the valve seat.

The top of the body portion is closed by a large cap 6 in the form of a nut having a threaded engagement with the interior wall of the body portion of the valve. The opening closed by this cap is sufficiently large to permit the removal therewith of the valve structure. This comprises an expansible and compressible element 7 of tubular form and of the corrugated metal bellows type, as shown. The upper opening of this controlling element is closed by the flange 8 of a nut 9, which latter has a threaded engagement with the interior of the cap 6 and is supported thereby, a split spring washer 10 being inserted between the end of the nut 9 and the interior of the cap for locking the nut in position. A tight joint is formed between the flange 8 and the top of the element 7, as by soldering.

The lower opening of the element 7 is closed by a disk 11 from the lower part of which a cylinder 12 extends. At the lower portion of the cylindrical part 12 is an outwardly extending flange 12a to which the lower end of the element 7 is connected to form a tight joint, as by soldering. The interior of the element 7 thus forms a hermetically sealed chamber into which a volatile substance of proper amount is introduced conveniently through an opening in the disk 11 closed by a screw 11a. After introduction of the volatile substance, the head of the screw is preferably covered with solder to insure complete closure of the opening.

The interior of the cylinder 12 is threaded to receive a hollow nut 13, the head of the nut extending outwardly at its lower end, and also leaving a space between the inner end of the nut and the inner surface of the disk 11. A cylindrical valve head 14 is locked loosely within the nut 13 and is conical at its lower end to engage and close the valve seat 5. The upper end of the floating valve head is provided with an outwardly extending flange 14a which loosely fits in the opening between the inner end of the nut 13 and the disk 11, so as to have freedom of movement sidewise with reference to its supporting parts. The intermediate cylindrical portion of the valve head is loosely guided by the interior surface of the nut 13.

Around the controlling element 7 is a cylindrical shield 15 which extends substantially the entire length thereof and provided with an inwardly curved lower end portion which seats between the head of the nut 13 and the flange 12a. The shield is thus held in place by the nut 13 and may be readily removed or replaced by removal of this nut, this being likewise true of the floating valve head 14. In the lower end of the shield 15 are one or more openings 15a for permitting any condensate which collects between the controlling element 7 and the shield to drain into the body portion of the valve. Secured to the flange 8 of the nut 9 and extending downwardly therefrom within the controlling element 7 is a cylindrical guide 16 which serves as a stop to limit the permissible contraction of the element 7. The lower end of this stop 16 is open and engages the disk 11 to limit its movement in one direction. When the controlling element 7 is subjected to the temperature of incoming steam or vapor, the volatile substance within the chamber of the controlling element is volatilized and its force causes the longitudinal expansion of the controlling element and the closing of the valve. When the condensate in the body of the valve has lowered the temperature of the substance within the controlling element, it permits the contraction thereof and the valve is opened to permit the discharge of the condensate.

The floating valve head is self-adjusting in engaging the valve seat; and the construction insures that when the valve is closed, the axis of the valve head will coincide with the axis of the valve seat, thus insuring perfect and complete closure of the valve. This result is accomplished due to the fact that the floating valve head may, before the valve is completely closed, move freely with its axis parallel to the axis of the valve seat until these axes coincide at the time of actual closure of the valve.

The shield 15 protects the controlling element 7 from the impact of the high velocity steam or vapor, particles of liquid, dirt, scale and other foreign matter from striking directly against the expansible element 7 when the valve is opened; and consequently protects it from erosion and the lodging of foreign matter in its folds.

It is evident that by removing the cap 6, the entire valve structure may be conveniently withdrawn for repair or replacement and that all of the parts are of a simple form of construction which may be readily assembled.

Although I have described a preferred embodiment of the invention, the same may be modified without departing from the scope thereof.

I claim:

1. A valve comprising a valve seat, a cylindrical expansible element of the bellows type, an element closing one end of said expansible element, a hollow nut within said closing element, a floating valve head loosely mounted between said nut and said closing element, and a shield surrounding said expansible element and secured to one end thereof between said nut and said closing element.

2. A valve comprising a body having an inlet and outlet, a cap covering an opening in said body opposite the outlet, a supporting element carried by the inner portion of said cap, an expansible element of the bellows type secured at one end to said supporting element, a closing element at the opposite end of said expansible element, a floating valve head loosely mounted within said closing element, a shield surrounding said expansible element and supported at one end by said closing element, and a stop within said expansible element for engaging said closing element to limit its movement in one direction.

3. A valve comprising a main enclosing body portion, a cylindrical expansible element within the body portion and supported therefrom, a hollow element closing one end of said expansible element and carried thereby and located within the same, a valve element located within said hollow element and adapted to engage the seat of the valve, and a retaining element for loosely supporting and guiding said valve element and engaging said hollow element.

4. A valve comprising a main enclosing body portion, a cylindrical expansible element within the body portion and supported therefrom, a hollow element closing one end of said expansible element and carried thereby and located within the same, a valve element located within said hollow element and adapted to engage the seat of the valve, a shield surrounding said expansible element having an inwardly extending flange at one end of said expansible element, and means for clamping said flange against the end of said expansible element.

5. A valve comprising a main enclosing body portion, a cylindrical expansible element within the body portion and supported therefrom, a hollow element closing one end of said expansible element and carried thereby and located within the same, a valve element located within said hollow element and adapted to engage the seat of the valve, a shield surrounding said expansible element having an inwardly extending flange at one end of said expansible element, and means for clamping said flange against the end of said expansible element and for loosely supporting and guiding said valve element.

6. A valve comprising a main enclosing body portion, a cylindrical expansible element within the body portion and supported therefrom, a second element closing one end of said expansible element and carried thereby, a valve element controlled by the movement of said second element and adapted to engage the seat of the valve, a shield surrounding said cylindrical element and having an inwardly extending flange at the said end of said expansible element, and a retaining element for engaging said flange and clamping the same to the end of said expansible element.

HERBERT A. SMITH.